US009590921B2

United States Patent
Cheng et al.

(10) Patent No.: US 9,590,921 B2
(45) Date of Patent: Mar. 7, 2017

(54) NETWORK GROUPING SYSTEM AND THE NETWORK GROUPING METHOD THEREOF

(71) Applicant: Institute For Information Industry, Taipei (TW)

(72) Inventors: Yu-Jung Cheng, Taichung (TW); Chung-Ting Kao, Taipei (TW)

(73) Assignee: Institute For Information Industry, Taipei (TW)

( * ) Notice: Subject to any disclaimer, the term of this patent is extended or adjusted under 35 U.S.C. 154(b) by 180 days.

(21) Appl. No.: 14/530,147

(22) Filed: Oct. 31, 2014

(65) Prior Publication Data

US 2016/0087839 A1 Mar. 24, 2016

(30) Foreign Application Priority Data

Sep. 23, 2014 (CN) .......................... 2014 1 0488689

(51) Int. Cl.
*G06F 15/173* (2006.01)
*H04L 12/931* (2013.01)
(Continued)

(52) U.S. Cl.
CPC ........ *H04L 49/354* (2013.01); *H04L 12/4641* (2013.01); *H04L 41/0803* (2013.01); *H04L 45/74* (2013.01); *H04L 49/70* (2013.01)

(58) Field of Classification Search
CPC ...... H04L 12/4641; H04L 45/74; H04L 49/70
(Continued)

(56) References Cited

U.S. PATENT DOCUMENTS 7,643,431 B2 * 1/2010 Pepper ................ H04L 12/2697
370/252
7,751,350 B1 * 7/2010 Pabst .................... H04W 88/14
370/285

(Continued)

FOREIGN PATENT DOCUMENTS

CN    101572655 A    11/2009
CN    102378394 A     3/2012
(Continued)

OTHER PUBLICATIONS

Office Action to the corresponding Japanese Patent Application rendered by the Japan Patent Office (JPO) on Dec. 22, 2015, 8 pages. (including English translation).
(Continued)

*Primary Examiner* — Hieu Hoang
(74) *Attorney, Agent, or Firm* — Skaar Ulbrich Macari, P.A.

(57) ABSTRACT

A network grouping system and a network grouping method thereof are provided. The network grouping system includes a controlling server and a connecting server. The connecting server connects to the controlling server via a switch. The connecting server embeds a grouping identifier into a network packet, and transmits the network packet to the controlling server via the switch. The controlling server retrieves the grouping identifier from the network packet, and creates a grouping configuration according to the grouping identifier. The grouping configuration records a matching relation of the grouping identifier with the connecting server. The controlling server further transmits the grouping configuration to the switch so that the switch passes on network packets according to the grouping configuration.

11 Claims, 9 Drawing Sheets

(51) Int. Cl.
*H04L 12/46* (2006.01)
*H04L 12/741* (2013.01)
*H04L 12/24* (2006.01)

(58) Field of Classification Search
USPC .................................................. 709/223, 224
See application file for complete search history.

(56) References Cited

U.S. PATENT DOCUMENTS

| | | | |
|---|---|---|---|
| 7,881,296 | B2 | 2/2011 | Joshi et al. |
| 8,638,789 | B1 * | 1/2014 | Pani ...................... H04L 12/185 370/390 |
| 8,739,270 | B1 | 5/2014 | Arnold |
| 9,319,300 | B2 * | 4/2016 | Huynh Van ............. H04L 45/00 |
| 2006/0265515 | A1 | 11/2006 | Shiga et al. |
| 2013/0058350 | A1 | 3/2013 | Fulton |
| 2013/0188521 | A1 | 7/2013 | Jain |
| 2013/0235862 | A1 * | 9/2013 | Kahng ................ H04L 61/6072 370/338 |
| 2014/0003442 | A1 | 1/2014 | Hernandez et al. |
| 2015/0016300 | A1 * | 1/2015 | Devireddy .......... H04L 41/0893 370/254 |
| 2015/0058470 | A1 * | 2/2015 | Duda .................. H04L 12/4633 709/224 |
| 2015/0381386 | A1 * | 12/2015 | Sigoure ............... H04L 12/4645 370/392 |
| 2016/0028628 | A1 * | 1/2016 | Sun ..................... H04L 12/6418 370/392 |

FOREIGN PATENT DOCUMENTS

| | | |
|---|---|---|
| JP | 3443283 B2 | 9/2003 |
| JP | 20065814 A | 1/2006 |
| JP | 200860631 A | 3/2008 |
| TW | 201233209 A | 8/2012 |

OTHER PUBLICATIONS

Office Action to the corresponding Taiwan Patent Application rendered by the Taiwan Intellectual Property Office (TIPO) on Jun. 2, 2016, 7 pages.

* cited by examiner

NETWORK GROUPING SYSTEM AND THE NETWORK GROUPING METHOD THEREOF

PRIORITY

This application claims priority to Chinese Patent Application No. 201410488689.7 filed on Sep. 23, 2014, which is hereby incorporated by reference in its entirety herein.

FIELD

The present invention relates to a network grouping system and a network grouping method thereof; and more particularly, the network grouping system and the network grouping method thereof according to the present invention accomplish network grouping directly through automatic setting.

BACKGROUND

To cope with different service environments, there is often a need for network grouping isolation in the conventional network architecture, and correspondingly, related software and hardware technologies have been developed. Among others, a commonly used way is to use real network hardware and virtual local area networks (VLAN), which accomplish the network grouping isolation mainly through use of network apparatuses in combination with a specific communication protocol.

However, as the complexity of network grouping increases with the advancement of the network technologies, more network apparatuses are needed to satisfy the need for network grouping isolation and this leads to a remarkably increased cost of the hardware and maintenance thereof. Furthermore, as the number of network apparatuses increases, introduction of the VLAN technology will cause a problem that the whole network might be disrupted due to erroneous settings of protocols (e.g., Trunking Protocol) of a small part of the apparatuses.

Even further, in the conventional network architecture, isolation of at most 4095 VLANs can be supported in a single physical network, which has become inadequate to satisfy the current network demands. Although nowadays the virtual extended local area network (VXLAN) is available to allow for more than 4096 VLANs in a physical network, the VXLAN requires use of additional hardware network apparatuses that are costly.

Therefore, in order to reduce the cost and increase the number of network grouping isolations simultaneously, primarily the conventional software-defined network (SDN) technology is used. Specifically, the SDN technology accomplishes the network grouping isolation mainly by use of a software protocol (e.g., OpenFlow). Apart from decreasing the number of network apparatuses to reduce the cost, this also allows for grouping isolation of more than 4095 LANs through software parameter definition.

However, in the current SDN technology, assignment of settings for the isolated grouping of the network is accomplished by the administrator, and as in the conventional technology, there is also a risk of network abnormal conditions due to erroneous settings as the complexity of the network grouping increases. Even further, in the SDN architecture, the control layer not only has to process general network packets (e.g., OpenFlow network packets), but also needs to provide an additional API interface to allow calling of other pieces of virtual management software in order to accomplish the isolation grouping and environment setting. Then, the architecture and the management setting of the conventional network isolation grouping technologies are still too complex.

Accordingly, an urgent need still exists in the art to provide a solution that can make an improvement on the shortcomings of the conventional technologies, simplify the architecture and the process flow of management setting, and accomplish the network isolation grouping automatically and directly so as to improve both the efficiency and the accuracy of the grouping.

SUMMARY

A primary objective of the present invention includes providing a network grouping method for a network grouping system. The network grouping system comprises a controlling server and a connecting server. The connecting server has a physical connection with a switch. The controlling server connects to the switch. The network grouping method comprises the following steps of: (a) enabling the connecting server to embed a grouping identifier into a network packet; (b) enabling the connecting server to transmit the network packet to the switch via the physical connection so that the switch transmits the network packet to the controlling server; (c) enabling the controlling server to retrieve the grouping identifier from the network packet; (d) enabling the controlling server to create a grouping configuration according to the grouping identifier, wherein the grouping configuration records a matching relation of the grouping identifier with the connecting server; and (e) enabling the controlling server to transmit the grouping configuration to the switch so that the switch passes on the network packet according to the grouping configuration.

To achieve the aforesaid objective, certain embodiments of the present invention include a network grouping system, which comprises a controlling server and a connecting server. The connecting server has a physical connection with a switch. The controlling server connects to the switch. The connecting server embeds a grouping identifier into a network packet, and transmits the network packet to the switch via the physical connection so that the switch transmits the network packet to the controlling server. The controlling server retrieves the grouping identifier from the network packet, and creates a grouping configuration according to the grouping identifier. The grouping configuration records a matching relation of the grouping identifier with the connecting server. The controlling server further transmits the grouping configuration to the switch so that the switch passes on the network packet according to the grouping configuration.

The detailed technology and preferred embodiments implemented for the subject invention are described in the following paragraphs accompanying the appended drawings for people skilled in this field to well appreciate the features of the claimed invention.

DETAILED DESCRIPTION

Figure 1A:
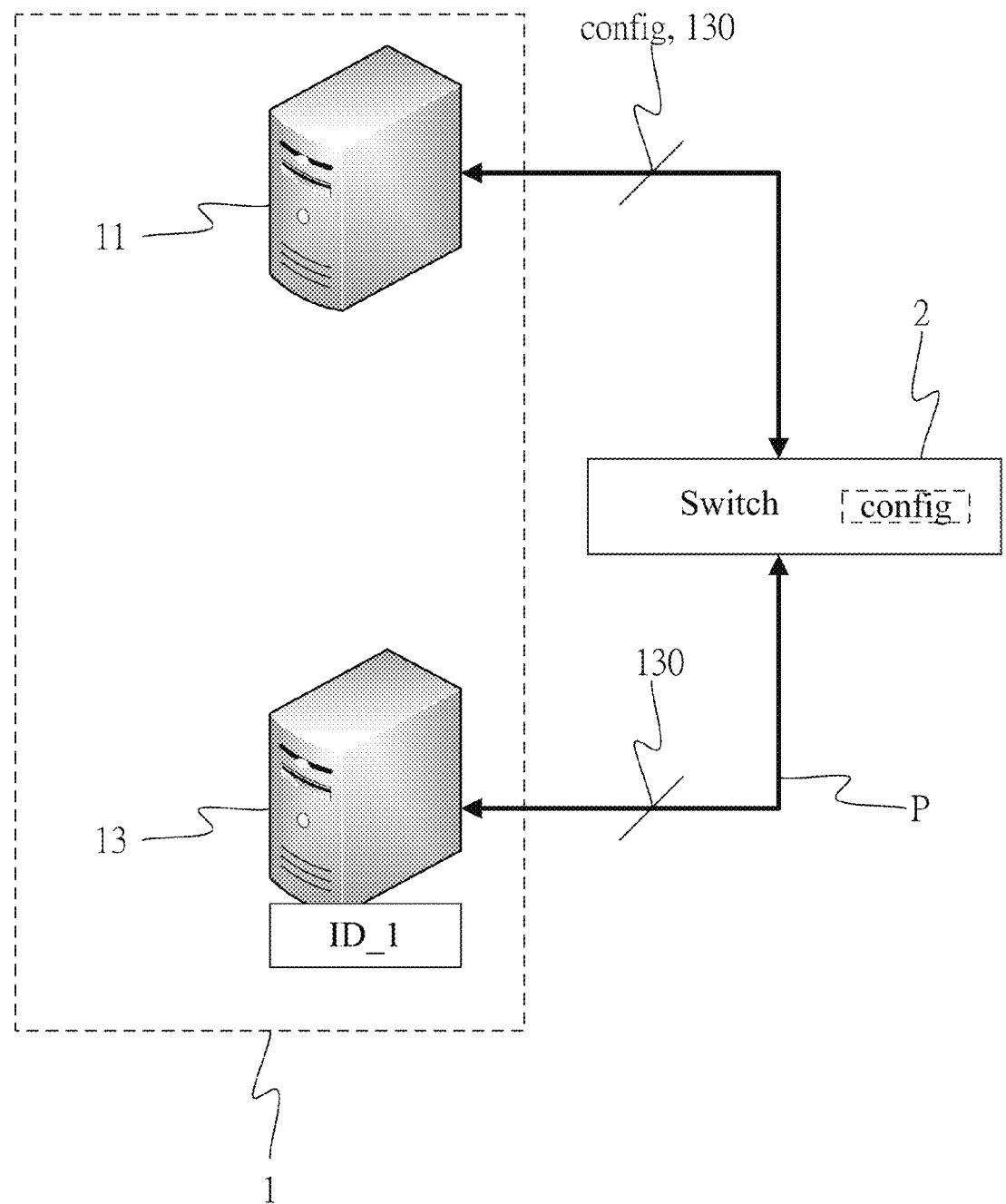
FIG. 1A is a schematic view illustrating a network grouping system according to a first embodiment of the present invention.

Hereinbelow, the present invention will be explained with reference to certain example embodiments thereof. However, these example embodiments are not intended to limit the present invention to any specific examples, embodiments, environments, applications or implementations described in these example embodiments. Therefore, description of the following example embodiments is only for purpose of illustration rather than to limit the present invention.

In the following embodiments and drawings, elements not directly related to the present invention are all omitted from depiction; and dimensional relationships among individual elements in the drawings are illustrated only for ease of understanding but not to limit the actual scale.

Figure 1B:
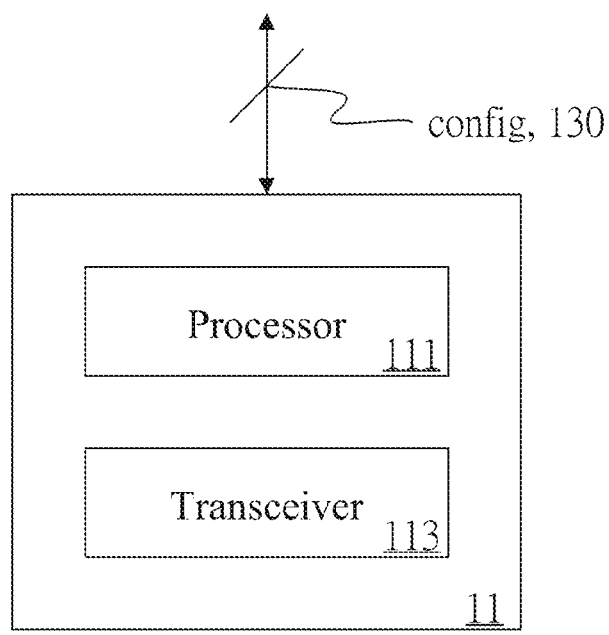
FIG. 1B is a block diagram of a controlling server according to the first embodiment of the present invention.
Figure 1C:
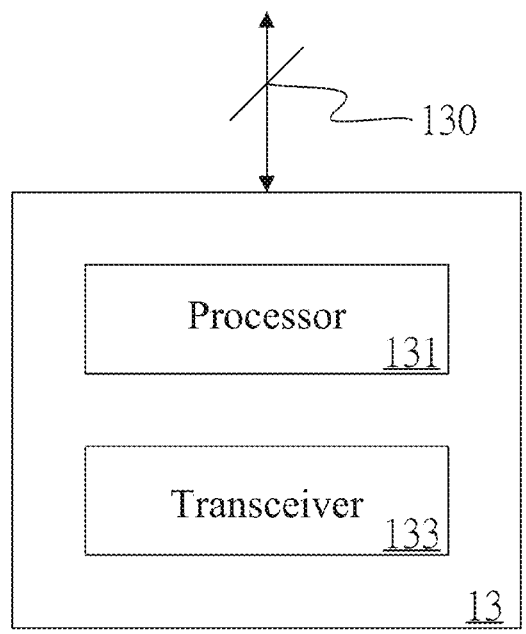
FIG. 1C is a block diagram of a connecting server according to the first embodiment of the present invention.

Referring to FIGS. 1A~1C together. FIG. 1A is a schematic view illustrating a network grouping system 1 according to a first embodiment of the present invention. The network grouping system 1 comprises a controlling server 11 and a connecting server 13. The connecting server 13 has a physical connection P with a switch 2. The controlling server 11 connects to the switch 2. FIG. 1B is a block diagram of the controlling server 11 according to the first embodiment of the present invention; and the controlling server 11 comprises a processor 111 and a transceiver 113. FIG. 1C is a block diagram of the connecting server 13 according to the first embodiment of the present invention; and the connecting server 13 comprises a processor 131 and a transceiver 133. The interactions between the elements will be further described hereinbelow.

Firstly, after connecting to the switch 2 via the physical connection P, the connecting server 13 can transmit a packet to the switch 2 via the physical connection P so that the switch 2 automatically passes on the packet to the controlling server 11 and then the controlling server 11 performs the network grouping directly according to the packet. Specifically, the processor 131 of the connecting server 13 firstly embeds a grouping identifier ID_1 into a network packet 130; and after the connecting server 13 connects to the switch 2 via the physical connection P, the transceiver 133 of the connecting server 13 transmits the network packet 130 to the switch 2 via the physical connection P. Then, the switch 2 directly transmits the network packet 130 to the controlling server 11.

Then, after the network packet 130 is received by the transceiver 113 of the controlling server 11, the processor 111 of the controlling server 11 analyzes the network packet 130 and retrieves the grouping identifier ID_1 from the network packet 130. Subsequently, the processor 111 of the controlling server 11 creates a grouping configuration config according to the grouping identifier ID_1. The grouping configuration config records a matching relation of the grouping identifier ID_1 with the connecting server 13.

Finally, the transceiver 113 of the controlling server 11 transmits the grouping configuration config to the switch 2. Then, the switch 2 can learn the network grouping of the connecting server 13 according to the matching relation of the grouping identifier ID_1 with the connecting server 13 that is recorded by the grouping configuration config so as to pass on the network packet belonging to the ID_1 network group to the connecting server 13 subsequently.

Figure 2:
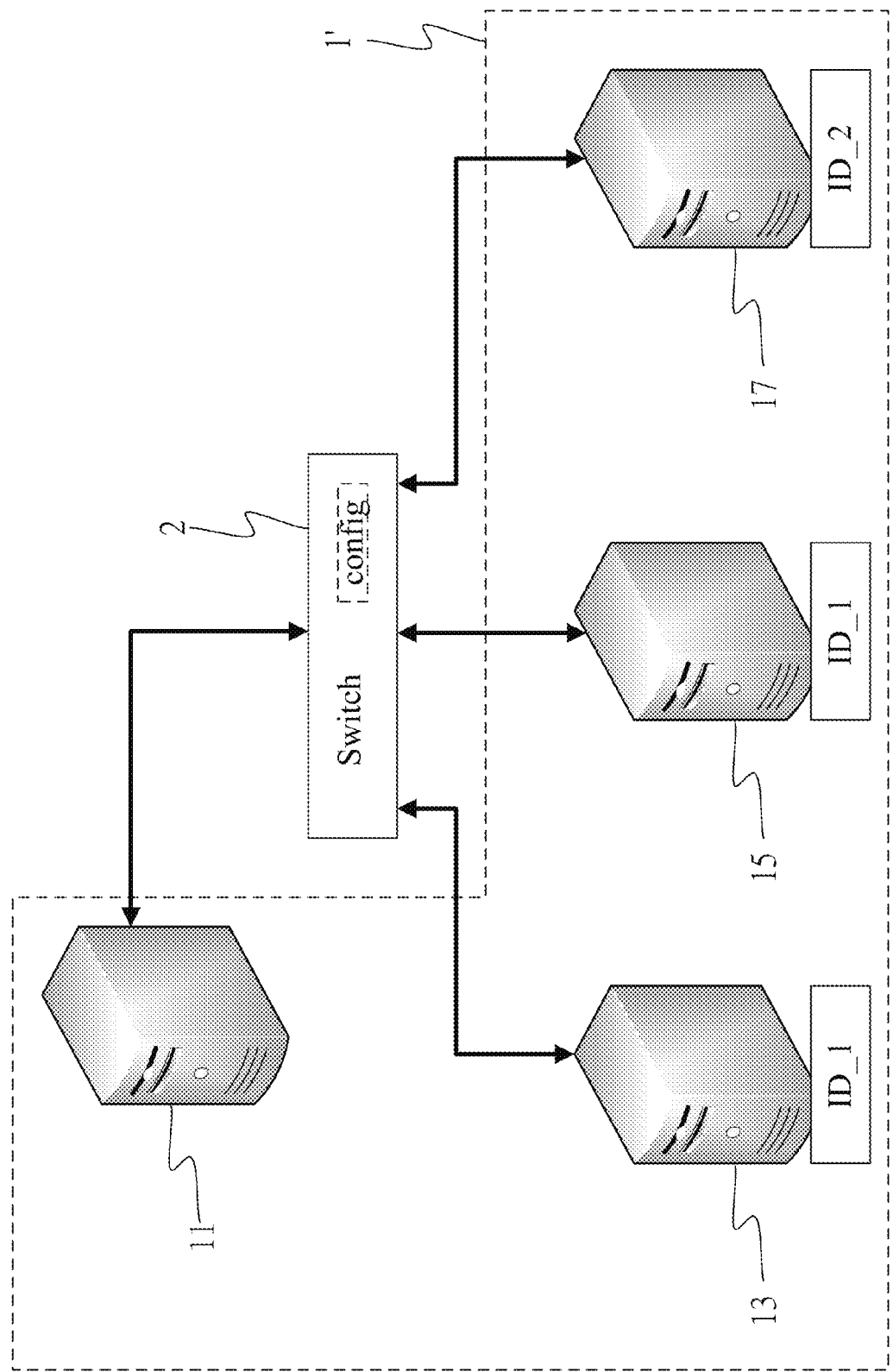
FIG. 2 is a schematic view illustrating a network grouping system according to a second embodiment of the present invention.

Referring to FIG. 2, there is shown a schematic view illustrating a network grouping system 1' according to a second embodiment of the present invention. It should be particularly appreciated that, the second embodiment has the same system architecture and network connection environment as the aforesaid embodiment, so elements bearing the same reference numerals also have the same functions and will not be further described herein. The second embodiment differs from the aforesaid embodiment in that, the network grouping system 1' of the second embodiment further comprises a connecting server 15 and a connecting server 17.

Specifically, when the connecting servers 15 and 17 connect to the switch 2, the matching of the groups can be accomplished through the aforesaid technical disclosures; and in this case, the grouping configuration config of the switch 2 further records a matching relation of the grouping identifier ID_1 with the connecting server 15 and a matching relation of a grouping identifier ID_2 with the connecting server 17.

Accordingly, when the network packet to be passed on to the grouping identifier ID_1 is received by the switch 2, the switch 2 will pass on the network packet to the connecting servers 13 and 15 that match the grouping identifier ID_1 according to the grouping configuration config, and the related network packet will not be received by the connecting server 17.

Similarly, when the network packet to be passed on to the grouping identifier ID_2 is received by the switch 2, the switch 2 will pass on the network packet to the connecting server 17 that matches the grouping identifier ID_2 according to the grouping configuration config, and the related network packet will not be received by the connecting servers 13 and 15. In this way, the network isolation grouping can be directly accomplished through the network packet carrying the grouping identifier and automatically transmitted when the connecting servers connect to the switch.

Figure 3A:
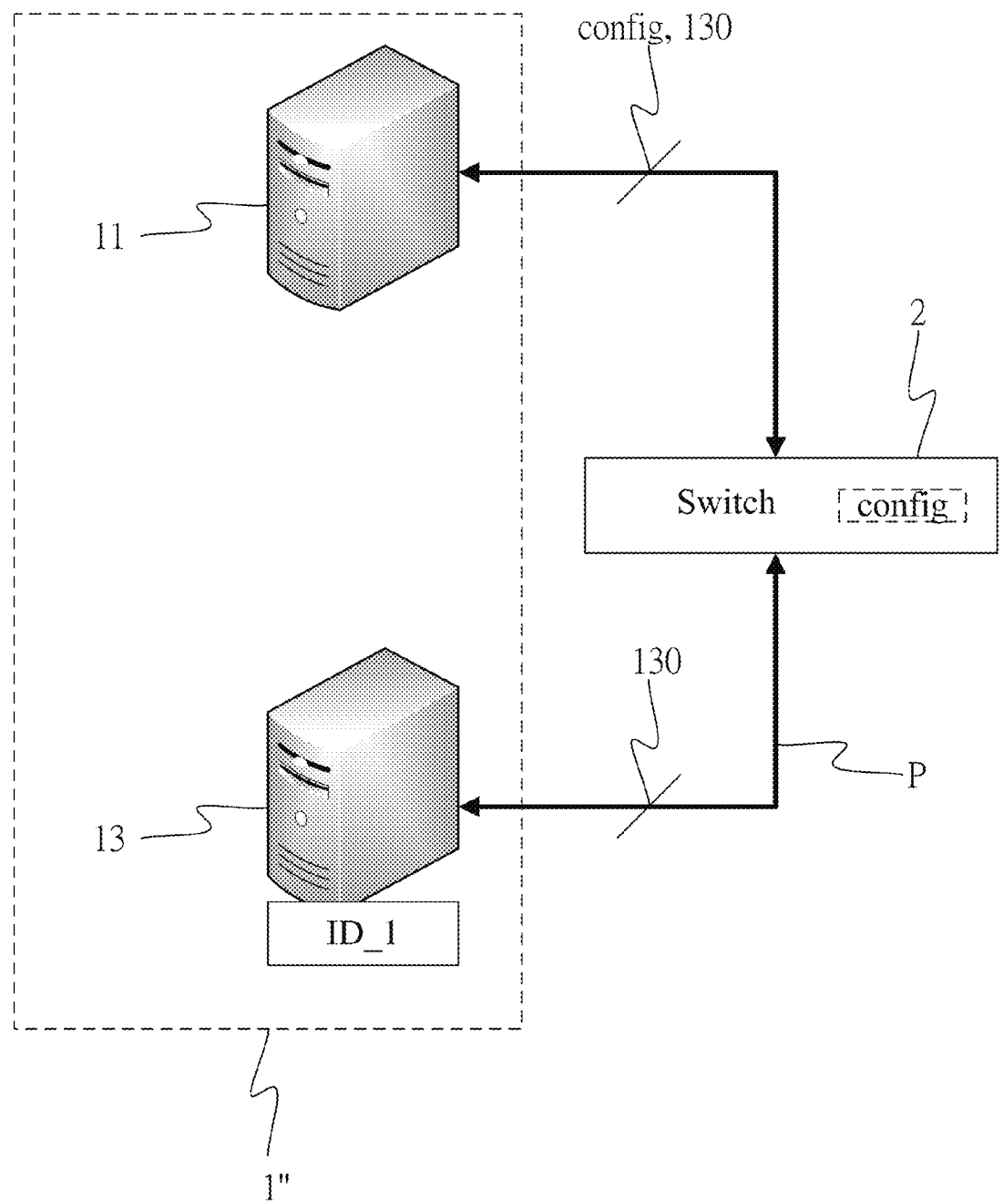
FIG. 3A is a schematic view illustrating a network grouping system according to a third embodiment of the present invention.

Referring to FIG. 3A, there is shown a schematic view illustrating a network grouping system 1" according to a third embodiment of the present invention. It should be particularly appreciated that, the third embodiment has the same system architecture and network connection environment as the aforesaid embodiments, so elements bearing the same reference numerals also have the same functions and will not be further described herein. The third embodiment further details the process of embedding and analyzing the grouping identifier.

Similarly, after connecting to the switch 2, the connecting server 13 transmits the packet to the switch 2 via the physical connection P; and then the switch 2 automatically transmits the packet to the controlling server 11 so that the controlling server 11 performs the network grouping directly according to the packet. Specifically, the processor 131 of the connecting server 13 firstly converts the grouping identifier ID_1 into a piece of network information (not shown). The network information comprises one of a network IP address, a Media Access Control (MAC) code, a connecting port code, and combinations thereof.

Subsequently, the processor 131 of the connecting server 13 further embeds the network information into which the grouping identifier ID_1 is converted and a controlling code (not shown) into the network packet 130; and after the connecting server 13 connects to the switch 2, the transceiver 133 of the connecting server 13 directly transmits the packet 130 to the controlling server 11 via the switch 2.

Then, after the network packet 130 is received by the transceiver 113 of the controlling server 11, the processor 111 of the controlling server 11 analyzes the network packet 130 and retrieves the controlling code and the network information from the network packet 130. The controlling code is mainly used to notify the controlling server 11 that the network information of the network packet 130 is the data into which the grouping identifier ID_1 is converted. Accordingly, the processor 111 of the controlling server 11 determines that the network information needs to be converted (i.e., encoded) according to the controlling code and converts the network information into the grouping identifier ID_1.

Finally, the processor 111 of the controlling server 11 creates the grouping configuration config according to the grouping identifier ID_1 and transmits the grouping configuration config to the switch 2 via the transceiver 113 so that the switch 2 passes on the network packet belonging to the ID_1 network grouping to the connecting server 13 subsequently.

Figure 3B:
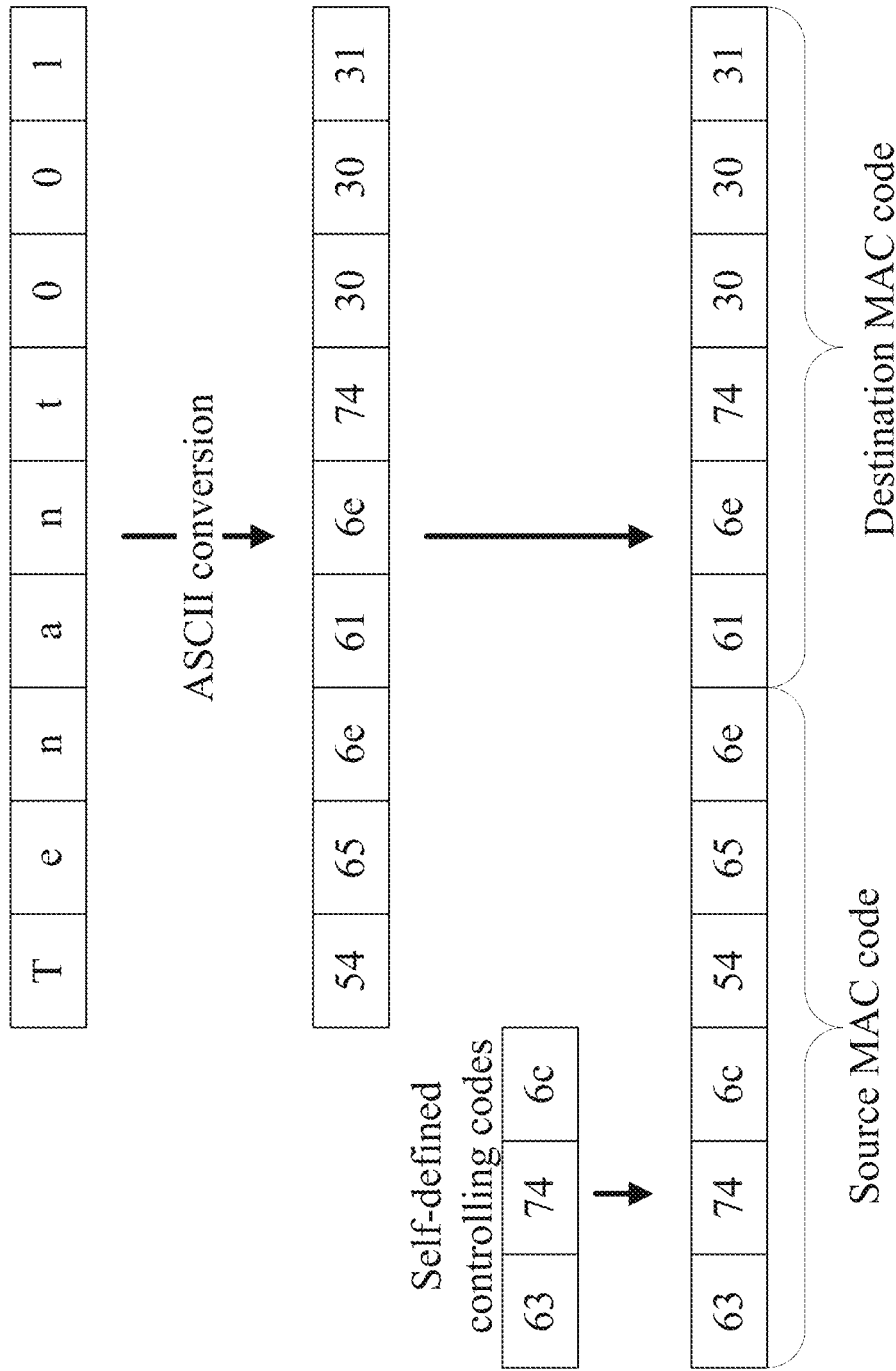
FIGS. 3B~3D are schematic views illustrating the process of converting a grouping identifier into a piece of network information according to a third embodiment of the present invention.

Referring to FIG. 3B, there is shown a schematic view illustrating the process of converting the grouping identifier into the network information according to the third embodiment of the present invention. Firstly, FIG. 3B mainly describes how to accomplish the conversion by using the MAC code and the ASCII encoding scheme. For example, assuming that the content of the grouping identifier ID_1 mainly comprises characters "Tenant001", then the grouping identifier will be converted into "54, 65, 6e, 61, 6e, 74, 30, 30, and 31" by the processor 131 of the connecting server 13 through the ASCII encoding scheme when the numerical range of the ASCII is the same as the numerical range of the MAC code.

Then, the source MAC code and the destination MAC code need 12 sets of numerical values altogether in the network packet 130. Therefore, in a case where the content of the ID_1 only has nine sets of numerical values after the conversion, the processor 131 can insert self-defined controlling codes "63, 74, and 6c" into the nine sets of numerical values to get the 12 sets of numerical values. At the same time, through setting the self-defined controlling codes, the controlling server 11 can determine that the network information of the network packet 130 is the data into which the grouping identifier ID_1 is converted so that corresponding operations can be performed subsequently.

Accordingly, after the network packet 130 is received by the transceiver 113 of the controlling server 11, the processor 111 of the controlling server 11 analyzes the network packet 130 to retrieve the controlling codes and the network information and then determines that the network information needs to be converted according to the controlling codes. Similarly, the processor 111 converts the nine sets of numerical values "54, 65, 6e, 61, 6e, 74, 30, 30, and 31", which are obtained by deducting the self-defined controlling codes from the source MAC code and the destination MAC code, into the content "Tenant001" of the grouping identifier ID_1 through the ASCII encoding scheme so that the recording and operations of the network isolation grouping can be performed subsequently.

Figure 3C:
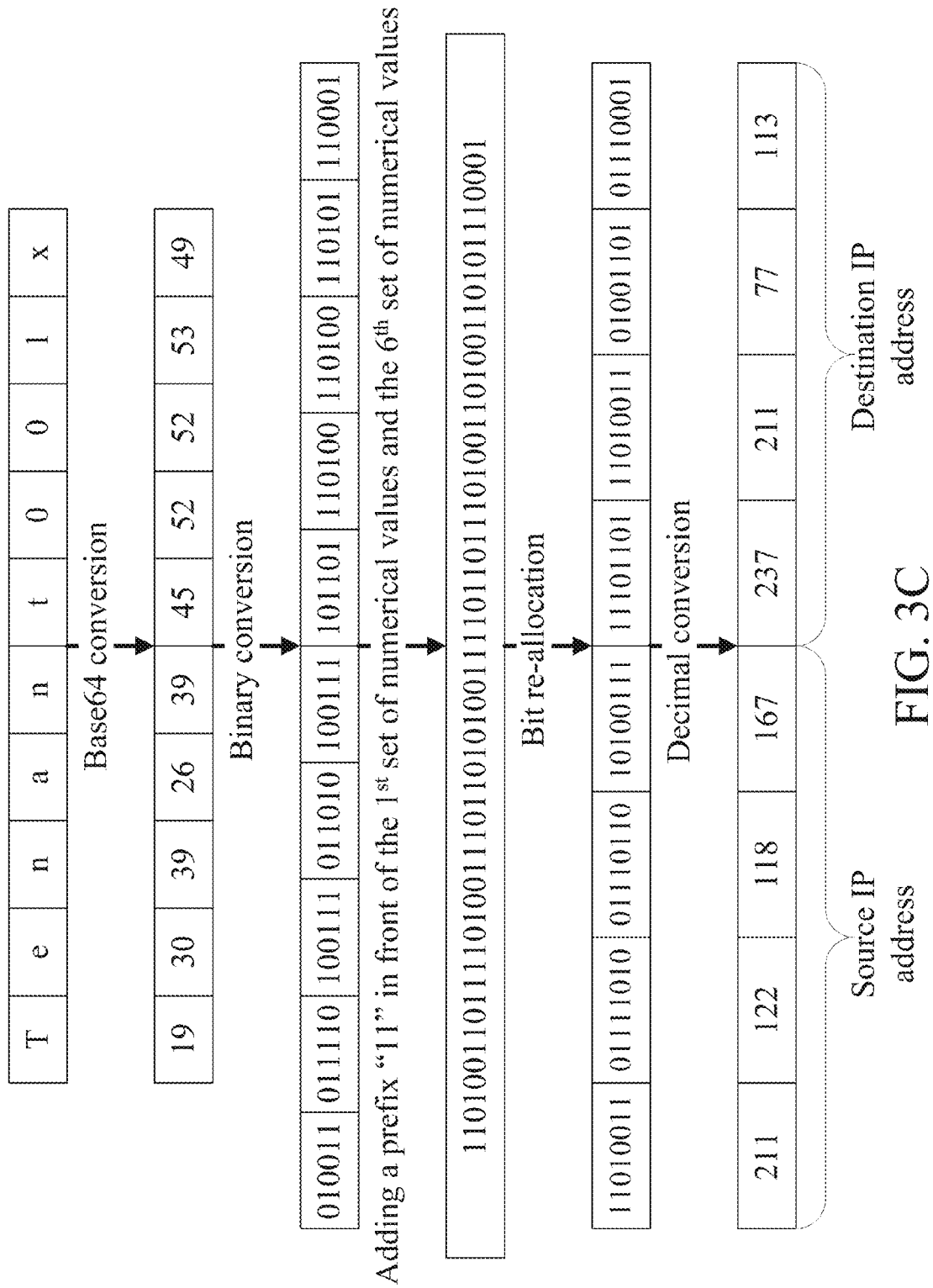

Referring to FIG. 3C, there is also shown a schematic view illustrating the process of converting the grouping identifier into the network information according to the third embodiment of the present invention. Firstly, FIG. 3C mainly describes how to accomplish the conversion by using the IP address and the Base64 encoding scheme. For example, assuming that the content of the grouping identifier ID_1 mainly comprises characters "Tenant001", then the processor 131 of the connecting server 13 firstly inserts a preset letter "x" into the ID_1 so that the ID_1 will have ten characters "Tenant001x", and then converts the ten characters into "19, 30, 39, 26, 39, 45, 52, 52, 53, and 49" through the Base64 encoding scheme.

Subsequently, the numerical values "19, 30, 39, 26, 39, 45, 52, 52, 53, and 49" are converted into binary numerical values "010011, 011110, 100111, 011010, 100111, 101101, 110100, 110100, 110101, and 110001". After a preset prefix "11" is added in front of the first set of numerical values and the sixth set of numerical values, a bit re-allocation is performed to adjust the numerical values representing the original bits into eight numerical value areas (as shown) so as to conform to the number of numerical values of the source IP address and the destination IP address.

Then, a decimal conversion is performed after the bit re-allocation to convert the numerical values in the eight numerical value areas into the IP address format. It should be particularly appreciated that, in this exemplary embodiment, the controlling codes may be the related network information in the MAC layer, so there is no need to particularly insert the self-defined controlling codes. In this way, the controlling server 11 can similarly determine that the network information of the network packet 130 is the data into which the grouping identifier ID_1 is converted so that corresponding operations are performed subsequently.

Similarly, after the network packet 130 is received by the transceiver 113 of the controlling server 11, the processor 111 of the controlling server 11 analyzes the network packet 130 to retrieve the controlling code and the network information, and determines that the network information needs to be converted according to the controlling codes. Then, similarly, the processor 111 converts the numerical values of the source IP address and the destination IP address into "Tenant001x" based on the encoding schemes of the Base64, the binary system, the decimal system and the bit re-allocation, and further analyzes it into the content "Tenant001" of the grouping identifier ID_1 so that the recording and operations of the network isolation grouping are performed subsequently.

Figure 3D:
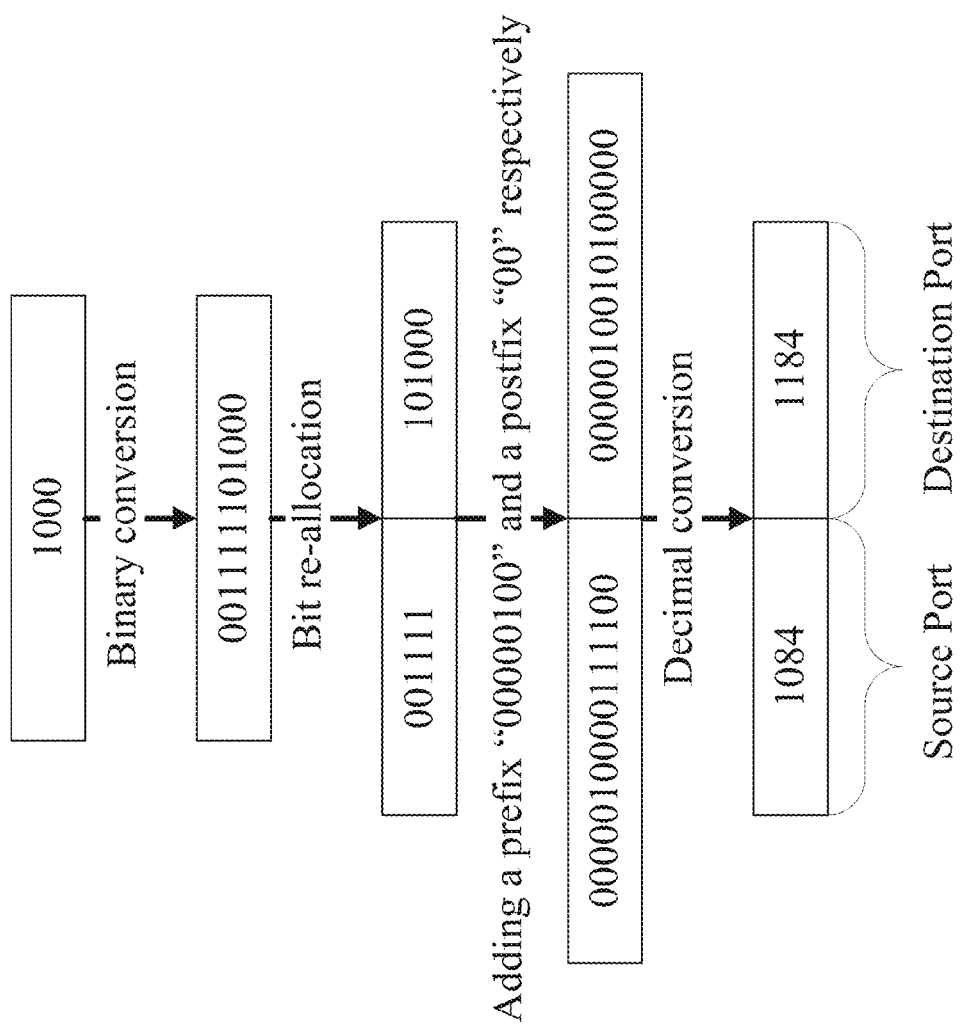

Referring to FIG. 3D, there is shown a schematic view illustrating the process of converting the grouping identifier into the network information according to the third embodiment of the present invention. Firstly, FIG. 3D mainly describes how to accomplish the conversion by using the Port code and encoding schemes of different systems. For example, assuming that the content of the grouping identifier ID_1 mainly comprises a numerical value "1000", then the processor 131 of the connecting server 13 firstly converts "1000" into a 12-bit binary numerical value "001111101000".

Subsequently, the numerical value "001111101000" is split into "001111" and "101000", and a prefix "00000100" and a postfix "00" are added to "001111" and "101000" respectively so that the 12-bit numerical value "001111101000" is expanded into a 32-bit numerical value "00000100001111000000010010100000. Then, the bit reallocation is performed on the 32-bit numerical value to adjust the numerical value representing the original bits into two numerical value areas (as shown) so as to conform to the number of numerical values of the source Port code and the destination Port code.

Then, the decimal conversion is performed after the bit re-allocation to convert the numerical values in the two numerical value areas into the Port code format. Similarly, in this exemplary embodiment, the controlling codes may be the related network information in other network layers, so there is no need to particularly insert the customized controlling codes. In this way, the controlling server 11 can also determine that the network information of the network packet 130 is the data into which the grouping identifier ID_1 is converted according to the controlling codes so that corresponding operations are performed subsequently.

Similarly, after the network packet 130 is received by the transceiver 113 of the controlling server 11, the processor 111 of the controlling server 11 analyzes the network packet 130 to retrieve the controlling codes and the network information, and determines that the network information needs to be converted according to the controlling codes. Similarly, the processor 111 converts the numerical values of the source Port code and the destination Port code into the content "1000" of the grouping identifier ID_1 through encoding schemes of different systems and the bit re-allocation so that the recording and operations of the network isolation grouping are performed subsequently.

It should be particularly appreciated that, FIGS. 3B-3D are used to illustrate how to embed the grouping identifier into the packet header and convert the grouping identifier into the network information in different network layers so that those skilled in the art can know the technical content of the present invention more clearly. However, this is not intended to limit the implementations of the present invention; and those skilled in the art can readily understand that the grouping identifier can be embedded and converted into any related network packet information (e.g., the packet header or the packet data load) according to the aforesaid technology of the present invention.

Figure 4:
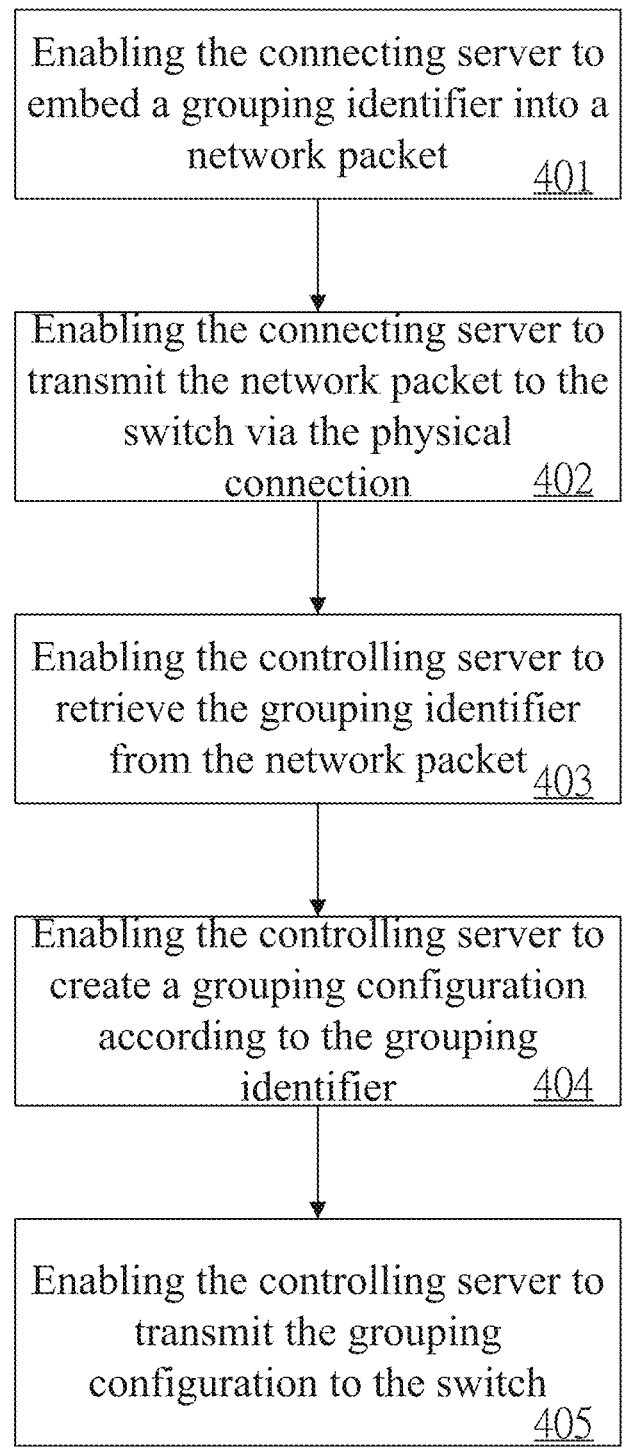
FIG. 4 is a flowchart diagram of a network grouping method according to a fourth embodiment of the present invention.

A fourth embodiment of the present invention is a network grouping method, a flowchart diagram of which is shown in FIG. 4. The method of the fourth embodiment is used in a network grouping system as well as a controlling server and a connecting server (e.g., the controlling server 11 and the connecting server 13 of the aforesaid embodiments) comprised therein. The connecting server has a physical connection with a switch. The controlling server connects to the switch. The steps of the fourth embodiment are detailed as follows.

Firstly, after the connecting server connects to the switch, a step 401 is executed to enable the connecting server to embed a grouping identifier into a network packet. A step 402 is executed to enable the connecting server to transmit the network packet to the switch via the physical connection so that the switch transmits the network packet to the controlling server. A step 403 is executed to enable the controlling server to retrieve the grouping identifier from the network packet. A step 404 is executed to enable the controlling server to create a grouping configuration according to the grouping identifier. The grouping configuration records a matching relation of the grouping identifier with the connecting server.

Finally, a step 405 is executed to enable the controlling server to transmit the grouping configuration to the switch. In this way, the switch can learn the network grouping of the connecting server according to the matching relation of the grouping identifier with the connecting server that is recorded by the grouping configuration so as to pass on the network packet belonging to the network group to the connecting server subsequently.

It should be particularly appreciated that, in other implementations, the grouping configuration further records a matching relation of the grouping identifier with another connecting server. In this way, the switch can pass on the network packet between the connecting server and the another connecting server which have the same grouping identifier according to the grouping configuration. In other words, the switch can pass on the network packet between the connecting servers which have the same grouping identifier according to the record of the grouping configuration.

Figure 5:
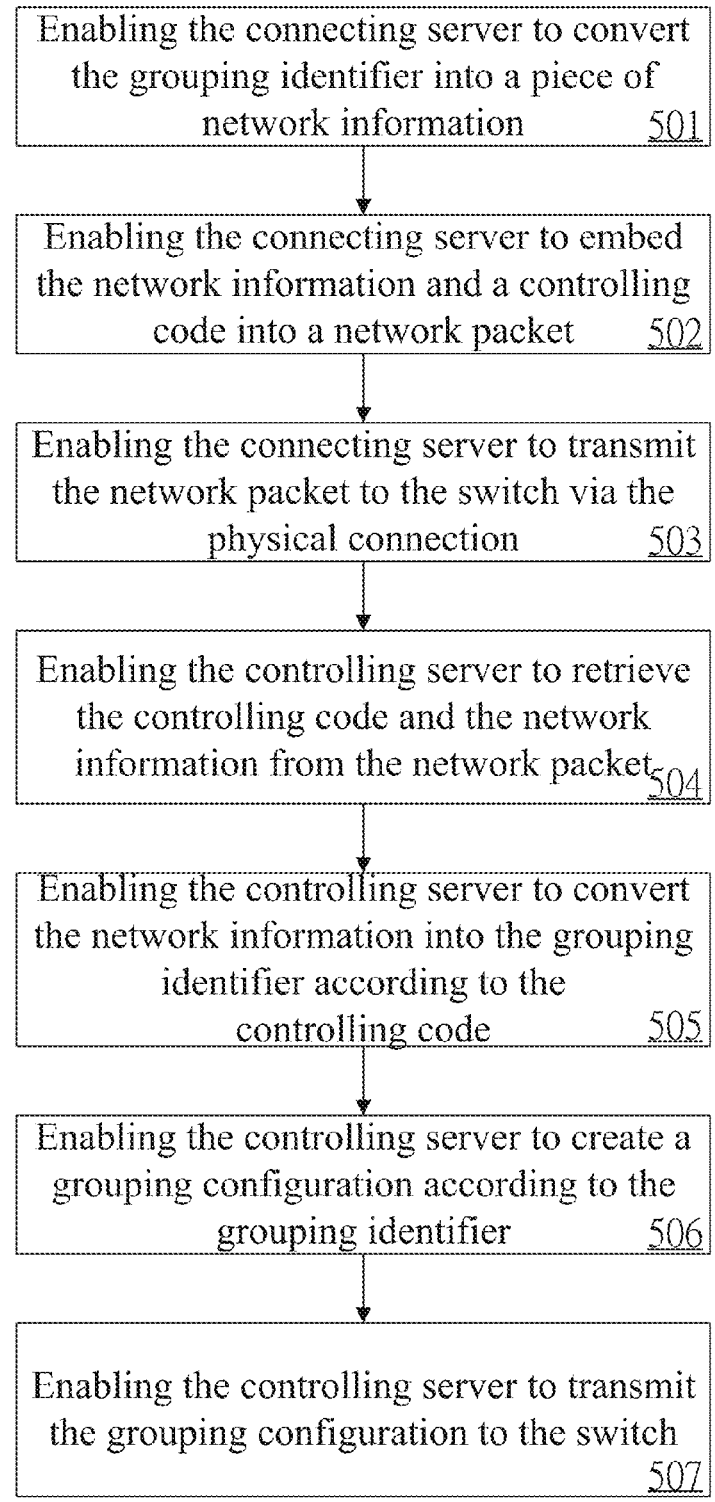
FIG. 5 is a flowchart diagram of a network grouping method according to a fifth embodiment of the present invention.

A fifth embodiment of the present invention is a network grouping method, a flowchart diagram of which is shown in FIG. 5. The method of the fifth embodiment is used in a network grouping system as well as a controlling server and a connecting server (e.g., the controlling server 11 and the connecting server 13 of the aforesaid embodiments) comprised therein. The connecting server has a physical connection with a switch. The controlling server connects to the switch. The steps of the fifth embodiment are detailed as follows.

Firstly, a step 501 is executed to enable the connecting server to convert the grouping identifier into a piece of network information. A step 502 is executed to enable the connecting server to embed the network information and a controlling code into a network packet. A step 503 is executed to enable the connecting server to transmit the network packet to the switch via the physical connection so that the switch transmits the network packet to the controlling server. A step 504 is executed to enable the controlling server to retrieve the controlling code and the network information from the network packet.

Then, a step 505 is executed to enable the controlling server to convert the network information into the grouping identifier according to the controlling code. Specifically, the controlling server may determine that the network information needs to be converted according to the controlling code, and then convert the network information into the grouping identifier. A step 506 is executed to enable the controlling server to create a grouping configuration according to the grouping identifier. Similarly, the grouping configuration records a matching relation of the grouping identifier with the connecting server.

Finally, s step 507 is executed to enable the controlling server to transmit the grouping configuration to the switch. In this way, similarly, the switch can learn the network grouping of the connecting server according to the matching relation of the grouping identifier with the connecting server that is recorded by the grouping configuration so as to pass on the network packet belonging to the network group to the connecting server subsequently.

According to the above descriptions, the network grouping system and the network grouping method thereof according to the present invention can automatically transmit the related information of the grouping identifier after the connecting server connects to the switch so that the controlling server and the switch can then directly perform the network grouping isolation more efficiently, which can make an improvement on the shortcomings of the conventional technologies.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network grouping method for a network grouping system, the network grouping system comprising a controlling server and a connecting server, the connecting server having a physical connection with a switch, and the controlling server connecting to the switch, the network grouping method comprising:
   (a1) the connecting server converting a grouping identifier into a piece of network information;
   (a2) the connecting server embedding the network information and a controlling code into a network packet, wherein the controlling code is used to notify the controlling server that the network information of the network packet is data into which the grouping identifier is converted;
   (b) the connecting server transmitting the network packet to the switch via the physical connection so that the switch transmits the network packet to the controlling server;
   (c1) the controlling server retrieving the controlling code and the network information from the network packet;
   (c2) the controlling server converting the network information into the grouping identifier according to the controlling code;
   (d) the controlling server creating a grouping configuration according to the grouping identifier, wherein the grouping configuration records a matching relation of the grouping identifier with the connecting server; and
   (e) the controlling server transmitting the grouping configuration to the switch so that the switch passes on the network packet according to the grouping configuration, wherein the network information further comprises one of a network IP address, a Media Access Control (MAC) code, a connecting port code, and combinations thereof.

2. The network grouping method as claimed in claim 1, wherein the grouping configuration further records a matching relation of the grouping identifier with another connecting server so that the switch transmits the network packet between the connecting server and the another connecting server which have the same grouping identifier according to the grouping configuration.

3. A network grouping system, comprising:
   a controlling server, connecting to a switch; and
   a connecting server, having a physical connection with the switch;
   wherein the connecting server converts a grouping identifier into a piece of network information, embeds the network information and a controlling code into a network packet, and transmits the network packet to the switch via the physical connection so that the switch transmits the network packet to the controlling server, and the controlling server retrieves the controlling code and the network information from the network packet, converts the network information into the grouping identifier according to the controlling code, creates a grouping configuration according to the grouping identifier, and further transmits the grouping configuration to the switch so that the switch passes on the network packet according to the grouping configuration, wherein the grouping configuration records a matching relation of the grouping identifier with the connecting server;
   wherein the controlling code is used to notify the controlling server that the network information of the network packet is data into which the grouping identifier is converted,
   wherein the network information further comprises one of a network IP address, a Media Access Control (MAC) code, a connecting port code, and combinations thereof.

4. The network grouping system as claimed in claim 3, wherein the grouping configuration further records a matching relation of the grouping identifier with another connecting server so that the switch transmits the network packet between the connecting server and the another connecting server which have the same grouping identifier according to the grouping configuration.

5. A network grouping method for a controlling server, the controlling server being used in a network grouping system which further comprises a connecting server, the connecting server having a physical connection with a switch, and the controlling server connecting to the switch, the network grouping method comprising:
   (a) the controlling server receiving a network packet from the connecting server via the switch;
   (b1) the controlling server retrieving a controlling code and a piece of network information from the network packet;
   (b2) the controlling server converting the network information into a grouping identifier according to the controlling code, wherein the controlling code is used to notify the controlling server that the network information of the network packet is the data into which the grouping identifier is converted;
   (c) the controlling server creating a grouping configuration according to the grouping identifier, wherein the grouping configuration records a matching relation of the grouping identifier with the connecting server; and
   (d) the controlling server transmitting the grouping configuration to the switch so that the switch passes on the network packet according to the grouping configuration,
   wherein the network information further comprises one of a network IP address, a Media Access Control (MAC) code, a connecting port code, and combinations thereof.

6. The network grouping method as claimed in claim 5, wherein the grouping configuration further records a matching relation of the grouping identifier with another connecting server so that the switch transmits the network packet between the connecting server and the another connecting server which have the same grouping identifier according to the grouping configuration.

7. A controlling server for a network grouping system, the network grouping system further comprising a connecting server, the connecting server having a physical connection with a switch, and the controlling server connecting to the switch, the controlling server comprising:
   a transceiver, being configured to receive a network packet from the connecting server via the switch; and
   a processor, being configured to retrieve a controlling code and a piece of network information from the network packet, convert the network information into a grouping identifier according to the controlling code, and create a grouping configuration according to the grouping identifier, wherein the grouping configuration records a matching relation of the grouping identifier with the connecting server and the controlling code is used to notify the controlling server that the network information of the network packet is the data into which the grouping identifier is converted; and wherein the transceiver is further configured to transmit the grouping configuration to the switch so that the switch passes on the network packet according to the grouping configuration, wherein the network information further comprises one of a network IP address, a Media Access Control (MAC) code, a connecting port code, and combinations thereof.

8. The controlling server as claimed in claim 7, wherein the grouping configuration further records a matching relation of the grouping identifier with another connecting server so that the switch transmits the network packet between the connecting server and the another connecting server which have the same grouping identifier according to the grouping configuration.

9. A network grouping method for a connecting server, the connecting server being used in a network grouping system which further comprises a controlling server, the connecting server having a physical connection with a switch, and the controlling server connecting to the switch, the network grouping method comprising:
 (a1) the connecting server converting a grouping identifier into a piece of network information;
 (a2) the connecting server embedding the network information and a controlling code into a network packet, wherein the controlling code is used to notify the controlling server that the network information of the network packet is data into which the grouping identifier is converted; and
 (b) the connecting server transmitting the network packet to the switch via the physical connection so that the switch transmits the network packet to the controlling server and then the controlling server retrieves the network information and the controlling code from the network packet, converts the network information into the grouping identifier according to the controlling code, creates a grouping configuration according to the grouping identifier and transmits the grouping configuration to the switch so that the switch passes on the network packet according to the grouping configuration, wherein the grouping configuration records a matching relation of the grouping identifier with the connecting server, wherein the network information further comprises one of a network IP address, a Media Access Control (MAC) code, a connecting port code, and combinations thereof.

10. The network grouping method as claimed in claim 9, wherein the grouping configuration further records a matching relation of the grouping identifier with another connecting server so that the switch passes on the network packet between the connecting server and the another connecting server which have the same grouping identifier according to the grouping configuration.

11. A connecting server for a network grouping system, the network grouping system further comprising a controlling server, the connecting server having a physical connection with a switch, and the controlling server connecting to the switch, the connecting server comprising:
 a processor, being configured to convert a grouping identifier into a piece of network information, and embed the network information and a controlling code into a network packet embed a grouping identifier into a network packet; and
 a transceiver, being configured to transmit the network packet to the switch via the physical connection so that the switch transmits the network packet to the controlling server and then the controlling server retrieves the network information and the controlling code from the network packet, converts the network information into the grouping identifier according to the controlling code, creates a grouping configuration according to the grouping identifier and transmits the grouping configuration to the switch so that the switch passes on the network packet according to the grouping configuration, wherein the grouping configuration records a matching relation of the grouping identifier with the connecting server and the controlling code is used to notify the controlling server that the network information of the network packet is data into which the grouping identifier is converted, wherein the network information further comprises one of a network IP address, a Media Access Control (MAC) code, a connecting port code, and combinations thereof.

\* \* \* \* \*